United States Patent
Ni et al.

(10) Patent No.: US 10,968,336 B2
(45) Date of Patent: Apr. 6, 2021

(54) FLAME RETARDANT COMPOSITION AND FLAME RETARDANT SYNTHETIC RESIN COMPOSITION

(71) Applicant: ADEKA CORPORATION, Tokyo (JP)

(72) Inventors: Yang Ni, Saitama (JP); Yutaka Yonezawa, Saitama (JP); Naoko Tanji, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 16/323,298

(22) PCT Filed: Jul. 4, 2017

(86) PCT No.: PCT/JP2017/024525
§ 371 (c)(1),
(2) Date: Feb. 5, 2019

(87) PCT Pub. No.: WO2018/042869
PCT Pub. Date: Mar. 8, 2018

(65) Prior Publication Data
US 2019/0169408 A1      Jun. 6, 2019

(30) Foreign Application Priority Data
Aug. 29, 2016    (JP) .............................. JP2016-167409

(51) Int. Cl.
| C08L 23/02 | (2006.01) |
| C08L 101/00 | (2006.01) |
| C08K 3/22 | (2006.01) |
| C08K 5/34 | (2006.01) |
| C09K 21/12 | (2006.01) |
| C09K 21/14 | (2006.01) |
| C08L 5/16 | (2006.01) |
| C08K 5/3492 | (2006.01) |
| C08K 5/52 | (2006.01) |
| C08K 5/00 | (2006.01) |

(52) U.S. Cl.
CPC .............. *C08L 23/02* (2013.01); *C08K 3/22* (2013.01); *C08K 5/34* (2013.01); *C08L 5/16* (2013.01); *C08L 101/00* (2013.01); *C09K 21/12* (2013.01); *C09K 21/14* (2013.01); *C08K 5/34922* (2013.01); *C08K 5/5205* (2013.01); *C08L 2201/02* (2013.01)

(58) Field of Classification Search
CPC .......... C08L 23/02; C08L 101/00; C08L 5/16; C08L 2201/02; C09K 21/14; C09K 21/12; C08K 5/34; C08K 3/22; C08K 5/5205; C08K 5/34922; C08K 2003/2296; C08K 5/0066
See application file for complete search history.

(56) References Cited

U.S. PATENT DOCUMENTS

| 4,341,694 A | 7/1982 | Halpern | |
| 2003/0088000 A1 | 5/2003 | Kimura et al. | |
| 2007/0176154 A1 | 8/2007 | Murase et al. | |
| 2012/0225291 A1* | 9/2012 | Karayianni | C08L 67/025 428/375 |
| 2013/0217814 A1* | 8/2013 | Yu | C09K 21/12 524/133 |
| 2014/0200292 A1 | 7/2014 | Okita et al. | |
| 2015/0337204 A1* | 11/2015 | Yamazaki | C08K 5/053 524/100 |
| 2016/0152798 A1 | 6/2016 | Kamimoto et al. | |
| 2017/0342239 A1 | 11/2017 | Ni et al. | |
| 2018/0002606 A1 | 1/2018 | Kamimoto et al. | |
| 2019/0106568 A1* | 4/2019 | Karayianni | C08K 5/1545 |

FOREIGN PATENT DOCUMENTS

| CN | 103562349 A | 2/2014 |
| CN | 105209576 A | 12/2015 |
| CN | 105504350 A | 4/2016 |
| EP | 2 933 311 A1 | 10/2015 |
| JP | 2001/131553 A | 5/2001 |
| JP | 2008/056901 A | 3/2008 |
| JP | 2015/218302 A | 12/2015 |
| JP | 2016/125035 A | 7/2016 |
| TW | 201625651 A | 7/2016 |
| TW | 201634677 A | 10/2016 |

(Continued)

OTHER PUBLICATIONS

Jian-Xiang Feng et al. "An intumescent flame retardant system using beta0cyclodextrin as a carbon source in polylactic acid (PLA)" Apr. 25, 2011 Polymers for advanced technologies pp. 1115-1112 (Year: 2011).*
International Search Report, dated Sep. 12, 2017, from corresponding PCT application No. PCT/JP2017/024525.
Extended European Search Report issued in European Patent Application No. 17845879.0 dated Jan. 8, 2020.
Lai, X. et al., "Synergistic Effect of Phosphorus-Containing Nanosponges on Intumescent Flame-Retardant Polypropylene," Journal of Applied Polymer Science, vol. 125, 1758-1765 (2012).

*Primary Examiner* — Andrew J. Oyer
(74) *Attorney, Agent, or Firm* — Nixon & Vanderhye

(57) ABSTRACT

A flame retardant composition contains: 20-50 parts by mass of at least one melamine salt selected from the group consisting of melamine orthophosphate, melamine pyrophosphate, and melamine polyphosphate, as component (A); 50-80 parts by mass of at least one piperazine salt selected from the group consisting of piperazine orthophosphate, piperazine pyrophosphate, and piperazine polyphosphate, as component (B), where the total of component (A) and component (B) is 100 parts by mass; and 1-50 parts by mass of β-dextrin as component (C).

5 Claims, No Drawings

(56) References Cited

FOREIGN PATENT DOCUMENTS

| WO | 2005/080494 A1 | 9/2005 |
| WO | 2016/111074 A1 | 7/2016 |
| WO | 2016/125612 A1 | 8/2016 |

* cited by examiner

FLAME RETARDANT COMPOSITION AND FLAME RETARDANT SYNTHETIC RESIN COMPOSITION

TECHNICAL FIELD

This invention relates to a flame retardant composition and a flame-retardant synthetic resin composition containing the same.

BACKGROUND ART

Synthetic resins have been applied widely to constructional materials, automotive parts, packaging materials, agricultural materials, housings of appliances, toys, and so forth because of their excellent chemical and mechanical characteristics. Most of synthetic resins are combustible and need to be rendered flame-retardant for some applications. It is well known that flame retardation is achieved by using halogen flame retardants, inorganic phosphorus flame retardants, including red phosphorus and polyphosphoric acid compounds, such as ammonium polyphosphates, organic phosphorus flame retardants typified by triarylphosphoric ester compounds, metal hydroxides, antimony oxide, which is a flame retardant synergist, and melamine compounds, either alone or as a combination thereof.

In particular, an intumescent flame retardant mainly comprising a salt between polyphosphoric acid or pyrophosphoric acid and a nitrogen-containing compound exhibits excellent flame retardancy. The intumescent flame retardant swells on combustion to form a swollen surface layer, which prevents diffusion of a decomposition product and heat transfer thereby to achieve flame retardation. Such a flame retardant is described, e.g., in patent literature 1 below.

Patent literature 2 below proposes a combined use of a nitrogen compound, such as a melamine phosphate or ammonium polyphosphate, and a bicyclic phosphate compound.

CITATION LIST

Patent Literature

Patent literature 1: US 2003/0088000A1
Patent literature 2: U.S. Pat. No. 4,341,694A

SUMMARY OF INVENTION

However, the conventional flame retardants have insufficient flame retardance and should be added in large quantities so as to impart sufficient flame retardancy to synthetic resins. The convention flame retardants are also insufficient in discoloration resistance or water resistance. Hence, a flame retardant that achieves excellent flame retardation even at a small amount of addition and exhibits good discoloration resistance and water resistance has been demanded.

An object of the invention is to provide a flame retardant composition that provides excellent flame retardancy and exhibits not only discoloration resistance but water resistance. Another object of the invention is to provide a flame-retardant synthetic resin composition containing the flame retardant composition and exhibiting excellent flame retardancy and exhibits not only discoloration resistance but water resistance.

The invention provides a flame retardant composition containing (A) 20 to 50 parts by mass of at least one melamine salt selected from the group consisting of melamine orthophosphate, melamine pyrophosphate, and melamine polyphosphate, (B) 50 to 80 parts by mass of at least one piperazine salt selected from the group consisting of piperazine orthophosphate, piperazine pyrophosphate, and piperazine polyphosphate, the sum of the components (A) and (B) being 100 parts by mass, and (C) 1 to 50 parts by mass of β-cyclodextrin.

The invention also provides a flame-retardant synthetic resin composition containing a synthetic resin and the flame retardant composition.

The invention also provides a molded article of the flame-retardant synthetic resin composition.

DESCRIPTION OF EMBODIMENTS

The invention will be described on the basis of its preferred embodiments.

The invention relates to a flame retardant composition. As used herein, the term "flame retardancy" means the property of having resistance to ignition, being ignitable but allowing only a very low speed of flame spread, or being ignitable but self-distinguishing and is preferably meant to meet at least the V-2 ranking of the UL-94V standard. The term "flame retardant composition" as used herein refers to a composition containing at least one flame retardant. The term "flame-retardant synthetic resin composition" refers to a composition containing at least one synthetic resin and having the above-defined flame retardancy.

The melamine salt that is used as component (A) in the flame retardant composition of the invention is selected from the group consisting of melamine orthophosphate, melamine pyrophosphate, and melamine polyphosphate. These melamine salts may be used either individually or in combination. Preferred of them is melamine pyrophosphate in terms of flame retardation, handling, and storage stability. When two or more of the melamine salts are used in combination, it is preferred that the mass proportion of melamine pyrophosphate in the melamine salts mixture be the highest.

While the melamine phosphate may be obtained by the reaction between a corresponding phosphoric acid or phosphate and melamine, it is preferable to use melamine pyrophosphate or melamine polyphosphate, particularly melamine pyrophosphate, obtained by heat-condensation of melamine orthophosphate.

The piperazine salt that is used as component (B) in the flame retardant composition of the invention is selected from the group consisting of piperazine orthophosphate, piperazine pyrophosphate, and piperazine polyphosphate. These piperazine salts may be used either individually or in combination. Preferred of them is piperazine pyrophosphate in terms of flame retardation, handling, and storage stability. When two or more piperazine salts are used in combination, it is preferred that the mass proportion of piperazine pyrophosphate in the piperazine salts mixture be the highest.

While the piperazine phosphate may be obtained by the reaction between a corresponding phosphoric acid or phosphate and piperazine, it is preferable to use as component (B) piperazine pyrophosphate or piperazine polyphosphate, particularly piperazine pyrophosphate, obtained by heat-condensation of piperazine orthophosphate.

The sum of components (A) and (B) in the flame retardant composition of the invention being 100 parts by mass, the content of component (A) in the composition is 20 to 50 parts by mass, preferably 40 to 50 parts by mass, and the content of component (B) is 50 to 80 parts by mass, preferably 50 to 60 parts by mass. When the components (A)

to (B) mass ratio is in that range, the intumescence (swollen mass) formed on burning exhibits high gas barrier and self-extinguishing properties.

Component (C) for use in the flame retardant composition of the invention will then be described.

Component (C) that can be used in the flame retardant composition of the invention is β-cyclodextrin represented by chemical formula (I):

[Chem. 1]

Chemical Formula I

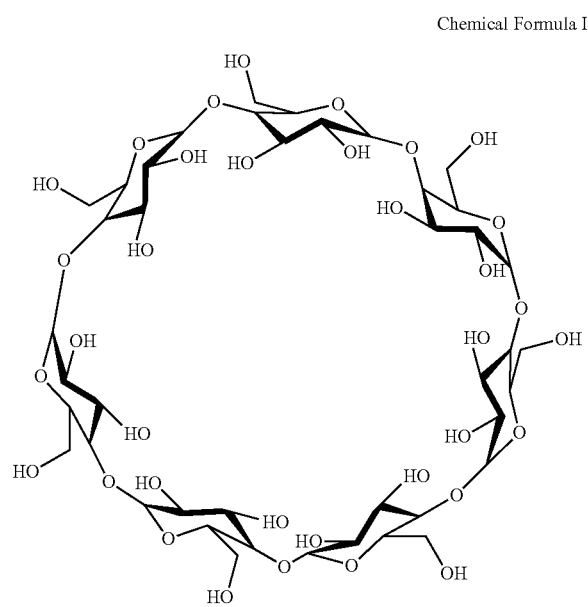

Cyclodextrins are a cyclic oligosaccharides composed of about 6 to 9 glucose units connected by α-1,4 linkages into a cyclic structure. Cyclodextrins are classified by the number of the constituent glucose units, including α-cyclodextrin composed of six glucose units (cf. chemical formula II below), β-cyclohextrin composed of seven glucose units, and γ-cyclodextrin composed of eight glucose units (cf. chemical formula III below). The invention is characterized by selecting β-cyclodextrin having seven glucose units from among these cyclodextrins.

[Chem. 2]

Chemical Formula II

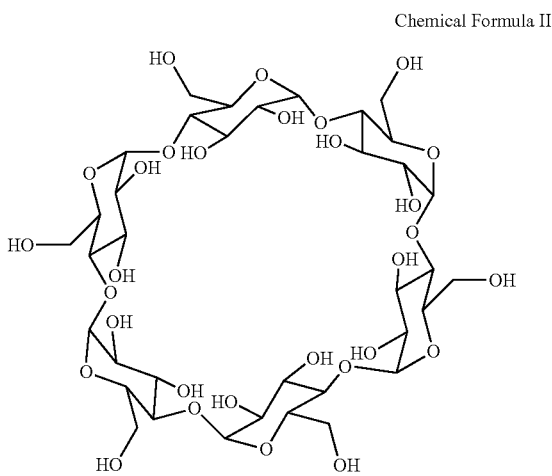

Chemical Formula III

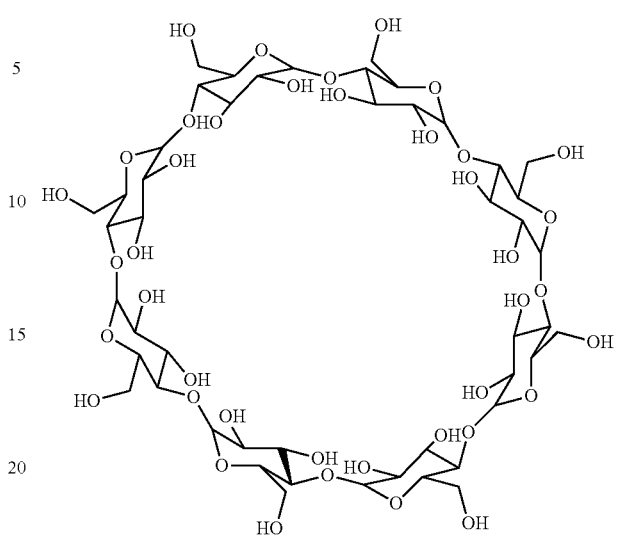

As used herein, the term "β-cyclodextrin" is intended to include not only β-cyclodextrin of formula (I) but a cyclohextrin derivative having the glucose side chain chemically modified and a cyclohextrin polymer obtained by three-dimensional crosslinking polymerization. Examples of β-cyclohextrin include methyl β-cyclodextrin, dimethyl β-cyclodextrin, ethyl β-cyclodextrin, hydroxypropyl β-cyclodextrin, dimethylaminoethyl β-cyclodextrin, maltosyl β-cyclodextrin, and β-cyclodextrin polymers.

The content of component (C) in the flame retardant composition of the invention is 1 to 50 parts by mass per 100 parts by mass of the sum of components (A) and (B). The content of component (C) is preferably 5 to 30 parts, more preferably 5 to 15 parts, by mass per 100 parts by mass of the sum of components (A) and (B) in terms of flame retardation and processability. With the content of component (C) being at least 1 part by mass, good intumescence formation and flame retardation are achieved. At the content of component (C) of 50 parts or less by mass, good discoloration resistance and processability are secured.

The flame retardant composition of the invention may further contain zinc oxide (ZnO) as component (D).

Zinc oxide functions in the composition as a flame retardant synergist. The zinc oxide may be surface-treated. Commercially available zinc oxide may be used. Examples of useful commercial products are zinc oxide JIS class 1 (from Mitsui Mining & Smelting Co., Ltd.), partially coated zinc oxide (from Mitsui Mining & Smelting), Nanofine 50 (ultrafine zinc oxide with an average particle size of 0.02 μm, from Sakai Chemical Industry Co., Ltd.), and Nanofine K (zinc silicate-coated ultrafine zinc oxide with an average particle size of 0.02 μm, from Sakai Chemical Industry).

From the viewpoint of flame retardation, the content of zinc oxide as component (D) is preferably 1.0 to 10 parts, more preferably 3.0 to 8.0 parts, even more preferably 3.0 to 6.0 parts, by mass per 100 parts by mass of the sum of components (A) and (B). With the zinc oxide content of 1.0 part by mass or more, good flame retardancy is exhibited. With the zinc oxide content of 10 parts by mass or less, adverse effect on processability is avoided.

The flame retardant composition of the invention may further contain a silane coupling agent. A silane coupling agent functions to inhibit agglomeration of flame retardant powder, improve storage stability, and impart water resistance and heat resistance. Useful silane coupling agents include compounds represented by general formula: A-$(CH_2)_k$—$Si(OR)_3$, wherein A is an organic functional group; k is a number of 1 to 3, and R is methyl or ethyl. Examples of the organic group as A include alkenyl, acryl, methacryl, epoxy, amino, isocyanurate, vinyl, mercapto, ureido, thioester, and isocyanate groups.

Examples of the silane coupling agents include alkenyl-functional silane coupling agents, such as vinyltrimethoxysilane, vinyltriethoxysilane, vinyltriacetoxysilane, vinyltris(2-methoxyethoxy)silane, vinylmethyldimethoxysilane, octenyltrimethoxysilane, allyltrimethoxysilane, and p-styryltrimethoxysilane; acryl-functional silane coupling agents, such as 3-acryloxypropyltrimethoxysilane and 3-acryloxypropyltriethoxysilane; methacryl-functional silane coupling agents, such as 3-methacryloxypropylmethyldimethoxysilane, 3-methacryloxypropyltrimethoxysilane, 3-methacryloxypropylmethyldiethoxysilane, 3-methacryloxypropyltriethoxysilane, and methacryloxyoctyltrimethoxysilane; epoxy-functional silane coupling agents, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and glycidoxyoctyltrimethoxysilane; amino-functional silane coupling agents, such as N-2-(aminoethyl)-3-aminopropylmethyldimethoxysilane, N-2-(aminoethyl)-3-aminoporopyltrimethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, N,N'-bis[3-(trimethoxysilyl)propyl]ethylenediamine, and N-(vinylbenzyl)-2-aminoethyl-3-aminopropyltrimethoxysilane hydrochloride; isocyanurate-functional silane coupling agents, such as tris(trimethoxysilylpropyl) isocyanurate; mercapto-functional silane coupling agents, such as 3-mercaptopropylmethyldimethoxysilane, 3-mercaptopropyltrimethoxysilane, and 3-mercaptopropyltriethoxysilane; ureido-functional silane coupling agents, such as 3-ureidopropyltrimethoxysilane and 3-ureidopropyltriethoxysilane; sulfide-functional silane coupling agents, such as bis(triethoxysilylpropyl) tetrasulfide; thioester-functional silane coupling agents, such as 3-octanoylthio-1-propyltriethoxysilane; and isocyanate-functional silane coupling agents, such as 3-isocyanatopropyltriethoxysilane and 3-isocanatopropyltrimethoxysilane. Among them preferred are epoxy-functional silane coupling agents in the interests of agglomeration inhibition, storage stability, water resistance, and heat resistance.

The content of the silane coupling agent in the flame retardant composition of the invention is preferably 0.1 to 5.0 parts, more preferably 0.1 to 2.0 parts, even more preferably 0.1 to 1.0 part, by mass per 100 parts by mass of the sum of components (A) and (B).

The flame retardant composition of the invention may contain silicone oil so as to inhibit agglomeration of flame retardant powder, improve storage stability, and improve dispersibility in synthetic resins. Examples of useful silicone oil include dimethyl silicone oil (polysiloxane having methyl in all the side chains and both terminals), methylphenyl silicone oil (polysiloxane having methyl in the side chains and terminals and phenyl in part of its side chains), methylhydrogen silicone oil (polysiloxane having methyl in the side chains and terminals and hydrogen in part of the side chains), and copolymers thereof. Modified silicone oils derived from these silicone oils by introducing an organic group to part of their side chains and/or terminals are also useful, including amino-modified, epoxy-modified, alicyclic epoxy-modified, carboxyl-modified, carbinol-modified, mercapto-modified, polyether-modified, long-chain alkyl-modified, fluoroalkyl-modified, higher fatty acid ester-modified, higher fatty acid amide-modified, silanol-modified, diol-modified, and phenol- and/or aralkyl-modified.

Specifically, examples of dimethyl silicone oil are KF-96, KF-965, and KF-968 (all from Shin-Etsu Chemical Co., Ltd.). Examples of methylhydrogen silicone oil include KF-99 and KF-9901 (both from Shin-Etsu Chemical); HMS-151, HMS-071, HMS-301, and DMS-H21 (all from Gelest, Inc.). Examples of methylphenyl silicone oil are KF-50, KF-53, KF-54, and KF-56 (all from Shin-Etsu Chemical). Examples of epoxy-modified silicone oil include X-22-343, X-22-2000, KF-101, KF-102, and KF-1001 (all from Shin-Etsu Chemical). Examples of carboxyl-modified silicone oil include X-22-3701E (from Shin-Etsu Chemical). Examples of carbinol-modified silicone oil are X-22-4039 and X-22-4015 (both from Shin-Etsu Chemical). Amino-modified silicone oil is exemplified by KF-393 (from Shin-Etsu Chemical).

Preferred of the silicone oils is methylhydrogen silicone oil in terms of prevention of agglomeration of flame retardant powder, improvement of storage stability, and improvement of dispersibility in synthetic resins.

The content of the silicone oil, if used, in the flame retardant composition of the invention is preferably 0.01 to 5.0 parts, more preferably 0.05 to 3.0 parts, even more preferably 0.1 to 2.0 parts, by mass per 100 parts by mass of the sum of components (A) and (B).

If desired, the flame retardant composition of the invention may contain a lubricant in an amount that does not adversely affect the effects of the invention. The lubricant may be added to the flame retardant composition of the invention or a synthetic resin which is to be compounded with the flame retardant composition of the invention. Useful lubricants include pure hydrocarbon lubricants, such as liquid paraffins, natural paraffins, microwaxes, synthetic paraffins, low-molecular polyethylenes, and polyethylene waxes; halogenated hydrocarbon lubricants; fatty acid lubricants, such as higher fatty acids and oxy fatty acids; fatty acid amide lubricants, such as fatty acid amides and bis-fatty acid amides; ester lubricants, such as lower alcohol esters of fatty acids, polyhydric alcohol esters of fatty acids (e.g., glycerides), polyglycol esters of fatty acids, and fatty alcohol esters of fatty acids (ester waxes); metal soaps; fatty alcohols; polyhydric alcohols; polyglycols; polyglycerols; partial esters of fatty acids and polyhydric alcohols; partial esters of fatty acids and polyglycol or polyglycerol; silicone oils; and mineral oils. These lubricants may be used in combination of two or more thereof. The amount of the lubricant to be added is preferably 0.05 to 10 parts, more preferably 0.1 to 5.0 parts, by mass per 100 parts by mass of the sum of components (A) and (B).

If desired, the frame retardant composition of the invention may contain a phenol antioxidant, a phosphorus antioxidant, or like antioxidants. The antioxidant may be added to the flame retardant composition of the invention or a synthetic resin which is to be compounded with the flame retardant composition of the invention. Addition of the antioxidant is preferred to stabilize the synthetic resin.

Examples of the phenol antioxidant include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene bis[(3,5-di-tert-butyl-4-hydroxyphenyl) propionic acid amide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyebutane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl (3,5-di-tert-butyl-4-hydroxyphenyl)propionate, tetrakis[methylene-3-(3,5-di-tert-butyl-4-hydroxyphenyl)propionate]methane, thiodiethylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl)propionyloxyethyl] isocyanurate, 3,9-bis[1,1-dimethyl-2-(3-tert-butyl-4-hydroxy-5-methylphenyl)propionyloxy ethyl]-2,4,8,10-tetraoxaspiro[5,5]undecane, and triethylene glycol bis[(3-tert-butyl-4-hydroxy-5-methylphenyl)propionate].

The amount of the phenol antioxidant, if added, is preferably 0.001 to 5 mass %, more preferably 0.05 to 3 mass %, relative to the synthetic resin composition containing the flame retardant composition of the invention.

Examples of the phosphorus antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetratridecyl isopropylidenediphenol diphosphite, tetratridecyl 4,4'-n-butylidenebis(2-tert-butyl-5-methylphenyl) diphosphite, hexatridecyl 1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene 10-oxide, 2,2'-methylenebis(4,6-di-tert-butylphenyl)-2-ethylhexyl phosphite, 2,2'-methylenebis(4,6-di-tert-butylphenyl)octadecyl phosphite, 2,2'-ethylidenebis(4,6-di-tert-butylphenyl) fluorophosphite, tris (2-[(2,4,8,10-tetrakis-tert-butyldibenzo[d,f][1,3,2] dioxaphosphepin-6-yl)oxy]ethyl)amine, and phosphite of 2-ethyl-2-butylpropylene glycol and 2,4,6-tri-tert-butylphenol.

The amount of the phosphorus antioxidant, if added, is preferably 0.001 to 5 mass %, more preferably 0.05 to 3 mass %, relative to the synthetic resin composition containing the flame retardant composition of the invention.

The flame retardant composition of the invention may optionally contain a nucleating agent in an amount that does not affect the effects of the invention. Any nucleating agents commonly employed for polymers, whether organic or inorganic, may be used as appropriate. The nucleating agent may be added to the synthetic resin which is to be compounded with the flame retardant composition of the invention.

Examples of the inorganic nucleating agent include kaolinite, synthetic mica, clay, zeolite, graphite, carbon black, magnesium oxide, titanium oxide, calcium sulfide, boron nitride, calcium carbonate, barium sulfate, aluminum oxide, neodymium oxide, and metal salts, such as phenylphosphonates. The inorganic nucleating agent may be modified with an organic substance so as to have improved dispersibility in the composition.

Examples of the organic nucleating agent include metal salts of organic carboxylic acids, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexanecarboxylate; organic sulfonic acid salts, such as sodium p-toluenesulfonate and sodium sulfoisophthalate; carboxylic amides, such as stearamide, ethylenebislauramide, palmitamide, hydroxystearamide, erucamide, and trimesic acid tris(tert-butyramide); benzylidenesorbitol and its derivatives, metal salts of phosphorus compounds, such as sodium 2,2'-methylenebis(4,6-di-tert-butylphenyl)phosphate; and sodium 2,2-methylbis(4,6-di-tert-butylphenyl).

The flame retardant composition of the invention may optionally contain a plasticizer in an amount that the does not impair the effects of the invention. Any plasticizers that are commonly used for polymers may be used as appropriate, including polyester plasticizers, glycerol plasticizers, polycarboxylic ester plasticizers, polyalkylene glycol plasticizers, and epoxy plasticizers. The plasticizer may be added to the synthetic resin which is to be compounded with the flame retardant composition of the invention.

If desired, the flame retardant composition of the invention may contain additives commonly used for synthetic resins. Useful additives include crosslinking agents, antistatics, metal soaps, fillers, antifogging agents, anti-plate-out agents, surface treating agents, fluorescent agents, antifungals, bactericides, foaming agents, metal inactivators, parting agents, pigments, processing aids other than acrylic processing aids, and so forth. The additives may be added to the synthetic resin which is to be compounded with the flame retardant composition of the invention.

The flame retardant composition of the invention may be prepared by mixing the essential components (A) to (C) and, if necessary, component (D) and other optional components using various mixing machines with or without heating. Examples of suitable mixing machines include a tumbler mixer, a Henschel mixer, a ribbon blender, a V-blender, a W-blender, a super mixer, and a Nauta mixer.

The flame retardant composition of the invention is effective in rendering a synthetic resin flame-retardant and preferably combined with a synthetic resin to provide a flame-retardant synthetic resin composition (hereinafter "the flame-retardant synthetic resin composition of the invention").

The synthetic resins to be made flame-retardant by the flame retardant composition of the invention include various thermoplastic and thermosetting resins. Examples of the thermoplastic resins include polyolefin resins, halogen-containing resins, aromatic polyester resins, linear polyester resins, degradable aliphatic polyamide resins, cellulose ester resins, polycarbonate resins, polyurethanes, and polyblends thereof. Examples of the thermosetting resins include phenol resins, urea resins, melamine resins, epoxy resins, and unsaturated polyester resins.

Other synthetic resins that can be rendered flame-retardant by the flame retardant composition of the invention include olefinic thermoplastic elastomers (TPEs), styrene TPEs, polyester TPEs, nitrile TPEs, nylon TPEs, vinyl chloride TPEs, polyamide TPEs, and polyurethane TPEs.

These synthetic resins may be used either individually or in combination of two or more thereof. These synthetic resins may be alloyed.

The above described synthetic resins can be used irrespective of molecular weight, degree of polymerization, density, softening point, solvent-insoluble content, degree of stereoregularity, presence or absence of catalyst residue, type and copolymerization ratio of monomers, type of catalyst for polymerization (e.g., Ziegler type or metallocene type), and the like. With regard to the thermoplastic resins, those having a melt flow rate (MFR) of 2.0 to 80 g/10 min, especially those with an MFR of 8.0 to 60 g/10 min, as measured at 230° C. and a 2.16 kg load in accordance with JIS K7210 are preferred in view of processability and flame retardancy.

Of the above recited synthetic resins preferred are polyolefin resins in view of excellent flame retardation effects obtained. Examples of the polyolefin resins include α-olefin polymers, such as polyethylene, low density polyethylene, linear low density polyethylene, high density polyethylene, polypropylene, homopolypropylene, random copolymer polypropylene, block copolymer polypropylene, impact copolymer polypropylene, high impact copolymer polypropylene, isotactic polypropylene, syndiotactic polypropylene, hemisotactic polypropylene, maleic anhydride-modified polypropylene, polybutene, cycloolefin polymers, stereoblock polypropylene, poly-3-methyl-1-butene, poly-3-methyl-1-pentene, and poly-4-methyl-1-pentene; and α-olefin copolymers, such as ethylene-propylene block or random copolymers, ethylene-methyl methacrylate copolymers, and ethylene-vinyl acetate copolymers.

The flame-retardant synthetic resin composition of the invention preferably contains 50 to 90 mass %, more preferably 60 to 80 mass %, of the synthetic resin and 10 to 40 mass %, more preferably 20 to 30 mass %, of the flame retardant composition. With the flame retardant composition content being 10 mass % or more, the resin composition exhibits sufficient flame retardancy. With that content being not more than 40 mass %, the physical properties of the resin are less likely to be impaired.

The flame-retardant synthetic resin composition of the invention can be molded to provide molded articles having high flame retardancy. The flame-retardant synthetic resin composition may be molded by any molding methods, including extrusion, calendering, injection molding, rolling, compression molding, and blow molding, to give molded articles of various shapes, such as plates, sheets, films, and irregular shapes.

The flame-retardant synthetic resin composition of the invention is applicable to housings (frames, cases, covers, and enclosures) and parts of electric vehicles, machinery, electric and electronic equipment, and OA equipment, and automotive interior and exterior materials, particularly those needed to meet the UL94 5VA standard.

The flame-retardant synthetic resin composition of the invention and its molded articles find wide applications in various industrial fields, including electric & electronics, communications, agriculture, forestry, fisheries, mining, construction, foods, fibers, clothing, remedy, coal, petroleum, rubber, leather, automobiles, precision equipment, lumber, building materials, civil engineering, furniture, printing, musical instruments, and so on. Specifically, the applications include housings (frames, cases, covers, and enclosures) and parts of stationery and OA equipment (such as printers, personal computers, word processors, keyboards, PDAs (personal digital assistants), telephone sets, copiers, fax machines, ECRs (electronic cash registers), calculators, electronic diaries, cards, holders, and writing tools), household electric appliances (such as laundry machines, refrigerators, vacuum cleaners, microwave ovens, lighting equipment, game machines, irons, and kotatsu), audio and visual equipment (such as TV sets, VTRs, camcorders, radio-cassette recorders, tape recorders, mini discs, CD players, speakers, and liquid crystal displays), electric and electronic components and communication equipment (such as connectors, relays, capacitors, switches, printed circuit boards, coil bobbins, semiconductor sealants, LED sealants, electric wires, cables, transformers, deflection yokes, distribution boards, and clocks); and automotive interior and exterior materials.

The flame-retardant synthetic resin composition of the invention and its molded articles also find use as materials for gas (petrol) vehicles, hybrid vehicles, electrical vehicles, train cars, boats, ships, aircrafts, buildings, and houses, such as seats (stuffing and upholstery), belts, ceiling covering, convertible tops, arm rests, door trims, rear package trays, carpets, rugs, mats, sun visors, wheel covers, mattress covers, air bags, insulating materials, assist grips, assist straps, wire covering, electrical insulators, paints, coatings, overlays, flooring, inside corner moldings, carpet, wallpaper, wall covering, exterior covering, interior covering, roofing, decks, walls, pillars, floor plates, fences, frames and moldings, profiles for windows and doors, roof shingles, siding boards, terraces, balconies, soundproofing boards, heat insulating boards, and window boards; civil engineering materials; and housewares and sporting equipment, such as clothing, curtains, bed sheets, chip boards, fiber boards, carpets and rugs, doormats, sheets, buckets, hoses, containers, glasses, bags, cases, goggles, skis, rackets, tents, and musical instruments.

EXAMPLES

The invention will now be illustrated in greater detail with reference to Examples, but the invention is not deemed to be limited thereto. The compounding ratios in Table 1 are given in part by mass, and those in Table 2 are given in mass percent. In Table 2, "Compos." stands for composition, and "Compara." stands for comparative.

Examples 1 to 4 and Comparative Examples 1 to 4

Flame retardant compositions of the invention and comparative flame retardant compositions were prepared according to the compounding ratios shown in Table 1.

TABLE 1

|   |   | Example | | | | Comparative Example | | | |
|---|---|---|---|---|---|---|---|---|---|
| | Component | 1 | 2 | 3 | 4 | 1 | 2 | 3 | 4 |
| (A) | Melamine Pyrophosphate*[1] | 40 | 40 | 40 | 40 | 40 | 40 | 40 | 40 |

TABLE 1-continued

| | Component | Example 1 | Example 2 | Example 3 | Example 4 | Comparative Example 1 | Comparative Example 2 | Comparative Example 3 | Comparative Example 4 |
|---|---|---|---|---|---|---|---|---|---|
| (B) | Piperazine Pyrophosphate*2 | 60 | 60 | 60 | 60 | 60 | 60 | 60 | 60 |
| (C) | β-Cyclodextrin*3 | 5.3 | | 5.3 | | | | | |
| | β-Cyclodextrin Polymer*4 | | 5.3 | | 5.3 | | | | |
| Comparative (C) | α-Cyclodextrin*5 | | | | | 5.3 | | 5.3 | |
| | γ-Cyclodextrin*6 | | | | | | 5.3 | | 5.3 |
| (D) | Zinc Oxide (ZnO) | | | 5 | 5 | | | 5 | 5 |
| Silicone Oil | KF-96*7 | 0.3 | 0.3 | 0.3 | 0.3 | 0.3 | 0.3 | 0.3 | 0.3 |
| | KF-99*8 | 0.3 | 0.3 | 0.3 | 0.3 | 0.3 | 0.3 | 0.3 | 0.3 |

*1 Melamine Pyrophosphate:Pyrophosphoric acid to melamine molar ratio = 1:2.
*2 Piperazine Pyrophosphate:Pyrophosphoric acid to piperazine molar ratio = 1:1.
*3 β-Cyclodextrin: From Wacker Chemie AG
*4 β-Cyclodextrin Polymer: Available from Wako Pure Chemical Industries, Ltd.
*5 α-Cyclodextrin: Available from Wako Pure Chemical Industries, Ltd.
*6 γ-Cyclodextrin: Available from Wako Pure Chemical Industries, Ltd.
*7 KF-96: Dimethyl silicone oil from Shin-Etsu Chemical Co., Ltd.
*8 KF-99: Methylhydrogen silicone oil from Shin-Etsu Chemical Co., Ltd.

Examples 5 to 10 and Comparative Examples 5 to 11

A polypropylene resin composition was provided from 60 parts (by mass, hereinafter the same) of polypropylene (MFR: 8 g/10 min as measured at 2.16 kg load and 230° C. in accordance with JIS K7210), 0.1 parts of calcium stearate as an organic nucleating agent, 0.1 parts of tetrakis[methylene-3-(3,5-di-tert-butyl-4-hydroxyphenyl)propionate]methane as a phenol antioxidant, 0.1 parts of tris(2,4-di-tert-butylphenyl) phosphite as a phosphorus antioxidant, and 0.3 parts of glycerol monostearate as a lubricant. To the polypropylene resin composition was added each of the flame retardant compositions prepared in Examples 1 to 4 and Comparative Examples 1 to 4 in a compounding ratio (mass %) shown in Table 2 to prepare flame-retardant synthetic resin compositions of Examples 5 to 10 and comparative flame-retardant synthetic resin compositions of Comparative Examples 5 to 11.

The flame retardant compositions obtained in Examples 1 to 4 were designated flame retardant compositions 1 to 4, respectively. The comparative flame retardant compositions obtained in Comparative Examples 1 to 4 were designated comparative flame retardant compositions 1 to 4, respectively.

The resulting flame-retardant synthetic resin compositions were each press molded at 220° C. and 5 to 15 MPa for 15 minutes to make specimens for flammability test measuring 127 mm×12.7 mm×1.6 mm (t). The flame retardancy was evaluated using the specimens in accordance with the test method described below. The results obtained are shown in Table 2.

The resulting flame-retardant synthetic resin composition were also each press molded at 220° C. and 5 to 15 MPa for 15 minutes to make specimens for discoloration test measuring 60 mm×30 mm×2 mm (t). Discoloration was evaluated using the specimens in accordance with the method below. The results are shown in Table 2.

UL-94V Flammability Test Method:

Each specimen (127 mm long, 12.7 mm wide, 1.6 mm thick) was held with the long axis vertical. A flame of a burner was applied to the lower end of the specimen for 10 seconds and removed, and the flame duration was recorded. As soon as the specimen stopped burning, the flame was reapplied for 10 seconds, and the flame duration was measured in the same manner as in the first flame application. Ignition of the cotton layer placed below the specimen by any drips of flaming particles was also observed. The flame duration after each flame application and the ignition of the cotton layer were interpreted into a UL-94V flammability rating. The V-0 rating is the lowest flammability. The V-1 rating is less flame retardancy, and the V-2 rating is still less flame retardancy.

Discoloration Evaluation Method:

The YI (yellowness index) and b* value of the specimens (60 mm long, 30 mm wide, 2 mm thick) were measured using SC-P from Suga Test Instruments Co., Ltd.

TABLE 2

| Component | Example 5 | Example 6 | Example 7 | Example 8 | Example 9 | Example 10 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|
| Flame Retardant Compos. 1 | 20% | 22% | 24% | | | | | | | | | | |
| Flame Retardant Compos. 2 | | | | 24% | | | | | | | | | |
| Flame Retardant Compos. 3 | | | | | 22% | | | | | | | | |
| Flame Retardant Compos. 4 | | | | | | 22% | | | | | | | |
| Compara. Flame Retardant Compos. 1 | | | | | | | 26% | | | | | | |

TABLE 2-continued

| | Example | | | | | | Comparative Example | | | | | | |
|---|---|---|---|---|---|---|---|---|---|---|---|---|---|
| Component | 5 | 6 | 7 | 8 | 9 | 10 | 5 | 6 | 7 | 8 | 9 | 10 | 11 |
| Compara. Flame Retardant Compos. 2 | | | | | | | 26% | | | | | | |
| Compara. Flame Retardant Compos. 3 | | | | | | | | 20% | 22% | 24% | | | |
| Compara. Flame Retardant Compos. 4 | | | | | | | | | | | | 22% | 24% |
| UL94V Rating | V-2 | V-0 | V-0 | V-0 | V-0 | V-0 | V-2 | V-2 | V-2 | V-0 | V-0 | V-2 | V-2 |
| YI | 3.63 | 3.67 | 3.82 | 3.49 | 3.76 | 3.45 | 11.8 | 3.41 | 10.2 | 10.86 | 11.6 | 3.35 | 3.39 |

As is apparent from the results in Table 2, the synthetic resin achieves improved flame retardancy and improved discoloration resistance when compounded with the flame retardant composition containing β-cyclodextrin as component (C) according to the invention. In contrast, when in using the flame retardant composition containing α-cyclodextrin or γ-cyclodextrin as a comparative component (C), the improvement in flame retardancy or discoloration resistance is insufficient.

Specifically, the flame retardant compositions containing β-cyclodextrin (component (C)) provide flame-retardant synthetic resin compositions superior in flame retardancy and discoloration resistance whether or not the composition contains zinc oxide as is understood from the results of Examples 6 to 10. In distinction from this, as can be seen from the results of Comparative Examples 5, 8, and 9, the flame retardant composition containing α-cyclodextrin (comparative component (C)) is poor in flame retardation or discoloration resistance even when used in an increased amount as compared with Examples as in Comparative Example 5, in which zinc oxide is not used, or inferior in discoloration resistance even when used in amounts comparable to Examples 6 to 10 as in Comparative Examples 8 and 9, in which zinc oxide is present.

In addition, as is shown in Comparative Examples 6, 10, and 11, in the case of using γ-cyclodextrin, the improvement on heat resistance is insufficient irrespective of the amount of the flame retardant composition or whether or not zinc oxide is present.

INDUSTRIAL APPLICABILITY

The invention provides a flame retardant composition and a flame-retardant synthetic resin composition which are superior in not only flame retardancy and discoloration resistance but water resistance.

The invention claimed is:

1. A flame retardant synthetic resin composition comprising (i) a polyolefin resin and (ii) a flame retardant composition, wherein the flame retardant composition comprises (A) 40 to 50 parts by mass of melamine pyrophosphate, (B) 50 to 60 parts by mass of piperazine pyrophosphate, the sum of the components (A) and (B) being 100 parts by mass, and (C) 5 to 15 parts by mass of β-cyclodextrin.

2. The flame retardant synthetic resin composition according to claim 1, wherein the flame retardant composition further comprises (D) 1 to 10 parts by mass of zinc oxide.

3. A molded article obtained from the flame-retardant synthetic resin composition according to claim 1.

4. A method for rendering a polyolefin resin flame-retardant comprising mixing the polyolefin resin with a composition comprising (A) 40 to 50 parts by mass of melamine pyrophosphate, (B) 50 to 60 parts by mass of piperazine pyrophosphate, the sum of the components (A) and (B) being 100 parts by mass, and (C) 5 to 15 parts by mass of β-cyclodextrin.

5. A molded article obtained from the flame-retardant synthetic resin composition according to claim 2.

* * * * *